United States Patent
Cheah (10) Patent No.: US 9,862,057 B2
(45) Date of Patent: Jan. 9, 2018

(54) VACUUM DEGASSING LASER-BLOCKING MATERIAL SYSTEM AND PROCESS

(71) Applicant: United Technologies Corporation, Hartford, CT (US)

(72) Inventor: Kim Wei Cheah, Singapore (SG)

(73) Assignee: United Technologies Corporation, Farmington, CT (US)

( * ) Notice: Subject to any disclaimer, the term of this patent is extended or adjusted under 35 U.S.C. 154(b) by 618 days.

(21) Appl. No.: 14/104,648

(22) Filed: Dec. 12, 2013

(65) Prior Publication Data

US 2014/0205461 A1    Jul. 24, 2014

(51) Int. Cl.
| | |
|---|---|
| B23K 26/18 | (2006.01) |
| B29C 70/74 | (2006.01) |
| F01D 5/00 | (2006.01) |
| F01D 5/14 | (2006.01) |
| B29L 31/08 | (2006.01) |

(52) U.S. Cl.
CPC ............ *B23K 26/18* (2013.01); *B29C 70/745* (2013.01); *F01D 5/005* (2013.01); *F01D 5/14* (2013.01); *B29L 2031/08* (2013.01); *F05D 2230/13* (2013.01)

(58) Field of Classification Search
CPC .......... B23K 26/18; F01D 5/005; F01D 5/14; B29C 70/745; F05D 2230/13; B29L 2031/08
See application file for complete search history.

(56) References Cited

U.S. PATENT DOCUMENTS

| | | | |
|---|---|---|---|
| 4,165,358 A * | 8/1979 | Johnson ............... | B29C 33/202 264/102 |
| 5,140,127 A | 8/1992 | Stroud et al. | |
| 5,222,617 A | 6/1993 | Owen et al. | |
| 5,229,569 A | 7/1993 | Miyauchi et al. | |
| 5,368,634 A * | 11/1994 | Hackett ............ | H01L 21/67057 134/22.12 |
| 5,914,060 A | 6/1999 | Flis et al. | |
| 5,928,534 A * | 7/1999 | Flis ....................... | B23K 26/18 219/121.71 |
| 5,998,243 A * | 12/1999 | Odashima ......... | B29C 45/14655 257/E21.503 |
| 6,139,303 A | 10/2000 | Reed et al. | |
| 6,177,038 B1 | 1/2001 | Reed et al. | |
| 6,224,361 B1 | 5/2001 | Reed et al. | |
| 6,251,315 B1 | 6/2001 | Reed et al. | |
| 6,329,633 B1 * | 12/2001 | Lamm ................... | B23K 26/18 219/121.7 |
| 6,474,348 B1 | 11/2002 | Beggs et al. | |
| 6,544,360 B1 | 4/2003 | Reed et al. | |
| 7,503,113 B2 | 3/2009 | Gosling et al. | |

(Continued)

OTHER PUBLICATIONS

Singapore search report for Singapore patent appln. 2012091526 dated Jul. 11, 2014.

*Primary Examiner* — Galen Hauth
(74) *Attorney, Agent, or Firm* — O'Shea Getz P.C.

(57) ABSTRACT

A method of injecting laser-blocking material into a workpiece includes communicating molten laser-blocking material through the workpiece as the workpiece is subjected to at least a partial vacuum within an enclosed environment such that the partial vacuum expands any air bubbles in the laser-blocking material and transports the air bubbles out of the workpiece.

20 Claims, 5 Drawing Sheets

(56) References Cited

U.S. PATENT DOCUMENTS

| | | |
|---|---|---|
| 7,535,783 B2 | 5/2009 | Davis et al. |
| 7,730,756 B2 | 6/2010 | Gosling et al. |
| 8,105,133 B2 | 1/2012 | Jaybalan |
| 8,308,526 B2 | 11/2012 | Jaybalan |
| 2001/0008323 A1* | 7/2001 | Reed .................. B05C 7/04 264/267 |

* cited by examiner

VACUUM DEGASSING LASER-BLOCKING MATERIAL SYSTEM AND PROCESS

This application claims priority to Singapore Patent Appln. No. 201209152-6 filed Dec. 12, 2012.

BACKGROUND

The present disclosure relates to laser drilling of components, particularly, although not exclusively, the laser-drilling of holes in hollow gas turbine engine components.

Laser-drilling of holes such as film-cooling holes into internal passageways of airfoil components such as turbine blades is effective. The laser beam, however, must be blocked from drilling into the opposite side of the internal passageway to avoid damage thereto. Even minor damage to internal surfaces result in scrapped components from the production or overhaul processes.

SUMMARY

A method of injecting laser-blocking material into a workpiece according to one disclosed non-limiting embodiment of the present disclosure includes placing a workpiece in an enclosed environment, connecting a laser-blocking material inlet connection and outlet connection to the workpiece, subjecting the workpiece to an at least partial vacuum within the enclosed environment and communicating a molten laser-blocking material into the workpiece through the laser-blocking material inlet connection while subjecting the workpiece to the at least partial vacuum such that air bubbles in the laser-blocking material are expanded and transported out of workpiece through the laser-blocking material outlet connection.

In a further embodiment of the foregoing embodiment, the workpiece is an airfoil.

In a further embodiment of any of the foregoing embodiments, the workpiece is a blade.

In a further embodiment of any of the foregoing embodiments, the workpiece is a High Pressure Turbine blade.

In a further embodiment of any of the foregoing embodiments, the method includes determining that the molten laser-blocking material within the workpiece is air bubble free and shutting down the flow of laser-blocking material once the molten laser-blocking material within the workpiece is air bubble free. In the alternative or additionally thereto, the foregoing embodiment includes hardening the laser-blocking material and laser drilling the airfoil. In the alternative or additionally thereto, the foregoing embodiment includes removing the hardened laser-blocking material from the laser drilled airfoil.

A system according to another disclosed non-limiting embodiment of the present disclosure includes an enclosed environment operable to contain a workpiece, an inlet connection to communicate a laser-blocking material into the workpiece within said enclosed environment and an outlet connection to communicate the laser-blocking material from the workpiece within said enclosed environment as the workpiece is subjected to an at least partial vacuum within the enclosed environment such that the partial vacuum expands air bubbles in the laser-blocking material and the air bubbles are transported out of the workpiece.

In a further embodiment of the foregoing embodiment, the laser-blocking material is an epoxy resin.

In a further embodiment of any of the foregoing embodiments, the laser-blocking material is a wax.

In a further embodiment of any of the foregoing embodiments, the workpiece is an airfoil.

In a further embodiment of any of the foregoing embodiments, the workpiece is a blade.

In a further embodiment of any of the foregoing embodiments, the workpiece is a High Pressure Turbine blade.

A workpiece according to another disclosed non-limiting embodiment of the present disclosure includes a hardened, air bubble free, laser-blocking material within a passageway of the workpiece.

In a further embodiment of the foregoing embodiment, the laser-blocking material is an epoxy resin.

In a further embodiment of any of the foregoing embodiments, the laser-blocking material is a wax.

In a further embodiment of any of the foregoing embodiments, the workpiece is an airfoil.

In a further embodiment of any of the foregoing embodiments, the workpiece is a High Pressure Turbine blade.

BRIEF DESCRIPTION OF THE DRAWINGS

Various features will become apparent to those skilled in the art from the following detailed description of the disclosed non-limiting embodiment. The drawings that accompany the detailed description can be briefly described as follows.

DETAILED DESCRIPTION

Figure 1:
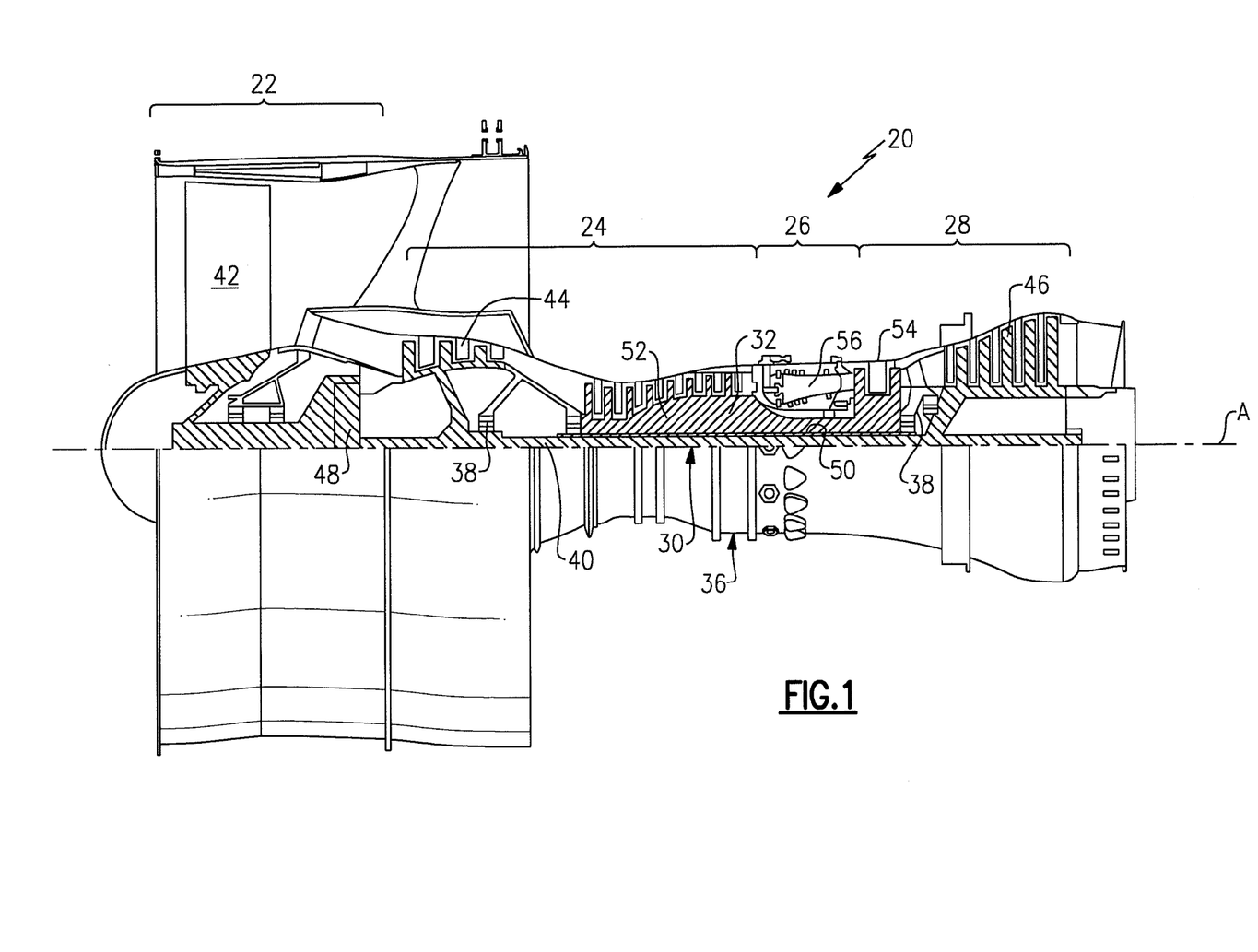
FIG. 1 is a schematic cross-section of a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flowpath while the compressor section 24 drives air along a core flowpath for compression and communication into the combustor section 26 then expansion through the turbine section 28. Although depicted as a turbofan gas turbine engine in the disclosed non-limiting embodiment, it should be understood that the concepts described herein are not limited to use with turbofans as the teachings may be applied to other types of turbine engines such as a three-spool (plus fan) engine wherein an intermediate spool includes an intermediate pressure compressor (IPC) between the LPC and HPC and an intermediate pressure turbine (IPT) between the HPT and LPT.

The engine 20 generally includes a low spool 30 and a high spool 32 mounted for rotation about an engine central longitudinal axis A relative to an engine static structure 36 via several bearing structures 38. The low spool 30 generally includes an inner shaft 40 that interconnects a fan 42, a low pressure compressor 44 ("LPC") and a low pressure turbine 46 ("LPT"). The inner shaft 40 drives the fan 42 through a geared architecture 48 to drive the fan 42 at a lower speed than the low spool 30.

The high spool 32 includes an outer shaft 50 that interconnects a high pressure compressor 52 ("HPC") and high pressure turbine 54 ("HPT"). A combustor 56 is arranged between the high pressure compressor 52 and the high pressure turbine 54. The inner shaft 40 and the outer shaft 50 are concentric and rotate about the engine central longitudinal axis A which is collinear with their longitudinal axes.

Core airflow is compressed by the low pressure compressor 44 then the high pressure compressor 52, mixed with the fuel and burned in the combustor 56, then expanded over the high pressure turbine 54 and the low pressure turbine 46. The turbines 54, 46 rotationally drive the respective low spool 30 and high spool 32 in response to the expansion.

Figure 2:
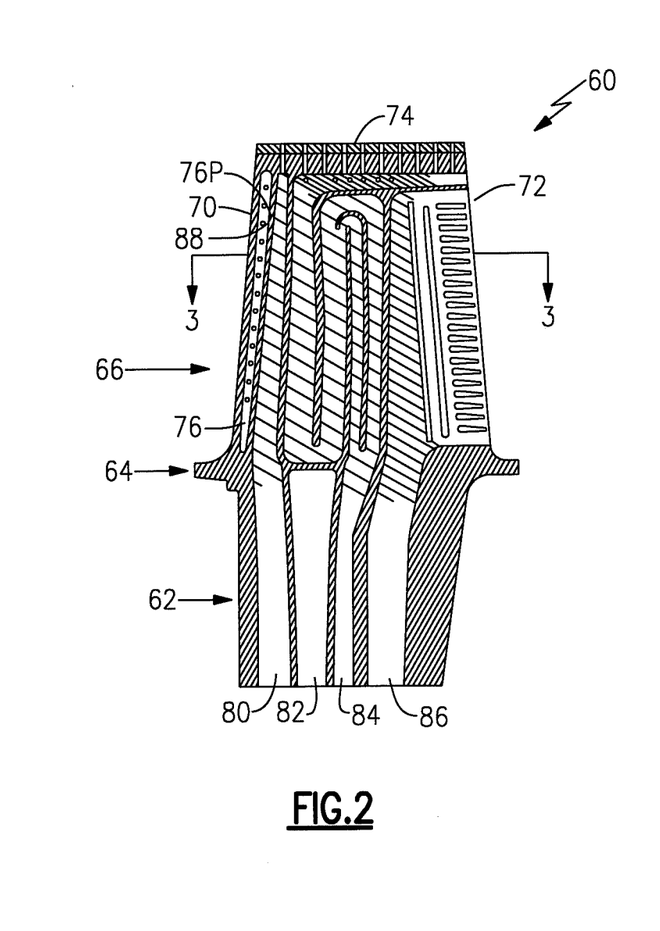
FIG. 2 is a side elevation, cross sectional view of an airfoil.
Figure 3:
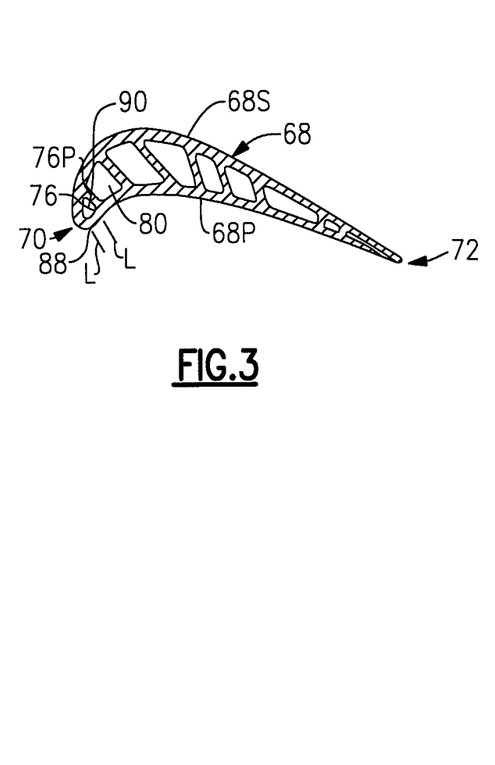
FIG. 3 is a cross-sectional view of the airfoil shown in FIG. 2 taken along the line 3-3.

With reference to FIG. 2, an exemplary workpiece 60, e.g., a rotor blade from the HPT 54 of the gas turbine engine 20. It should be understood that although a particular component type is illustrated in the disclosed non-limiting embodiment, other components with internal passageway will also benefit herefrom. The workpiece 60 in this example generally includes a root section 62, a platform section 64 and an airfoil section 66. The airfoil section 66 is defined by an outer wall 68 between a leading edge 70 and a trailing edge 72. The trailing edge 72 is spaced chordwise from the leading edge 70. The outer wall 68 defines a generally concave shaped portion forming a pressure side 68P and a generally convex shaped portion forming a suction side 68S (FIG. 3). The outer wall 68 extends spanwise from the platform section 64 to a tip 74 of the airfoil section 66. The workpiece 60 includes a plurality of cavities or passageways for cooling air as represented by a leading edge passageway 76 and supply passageways 80, 82, 84, 86 which may extend through the root section 62. The passageways 76-86 extend into the interior of the airfoil section 66 and often extend in serpentine or other non-linear fashion. It should be appreciated that the passageway arrangement is merely explanatory and that various passageways may alternatively or additionally be provided.

With reference to FIG. 3, a plurality of internal impingement holes, as represented by the hole 76P, connect the leading edge passageway 76 in the leading edge region with the supply passageway 78 to receive cooling air from the root section 62. A plurality of film cooling holes adjacent the leading edge 70, as represented by the holes 88, may extend from the leading edge passageway 76 in the leading edge region through outer wall 68.

Figure 4:
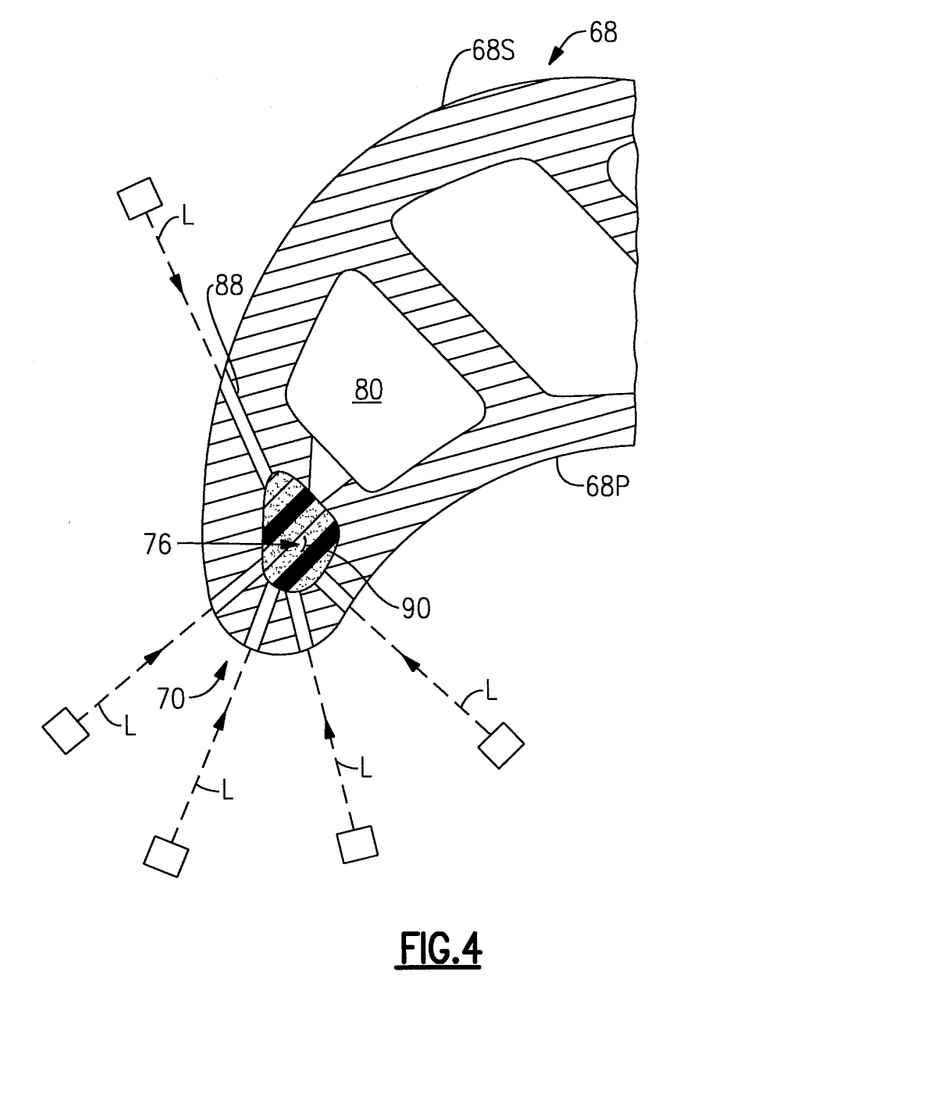
FIG. 4 is an expanded view of the leading edge of the airfoil shown in FIG. 3.

With reference to FIG. 4, one method to form the holes 88 is to laser drill each hole with a laser beam—as schematically represented by the laser beam L—from the exterior of the outer wall 68. As also schematically shown, a laser-blocking material 90 such as a wax composition, epoxy resin or other hardenable materials is disposed in one or more passageways such as the impingement passageway 76 to attenuate the intensity of the laser beam. The laser-blocking material ensures that the laser beam does not inadvertently injure structure that faces the cooling air hole as the laser beam breaks through the outer wall 68 during the laser drilling process.

Figure 5:
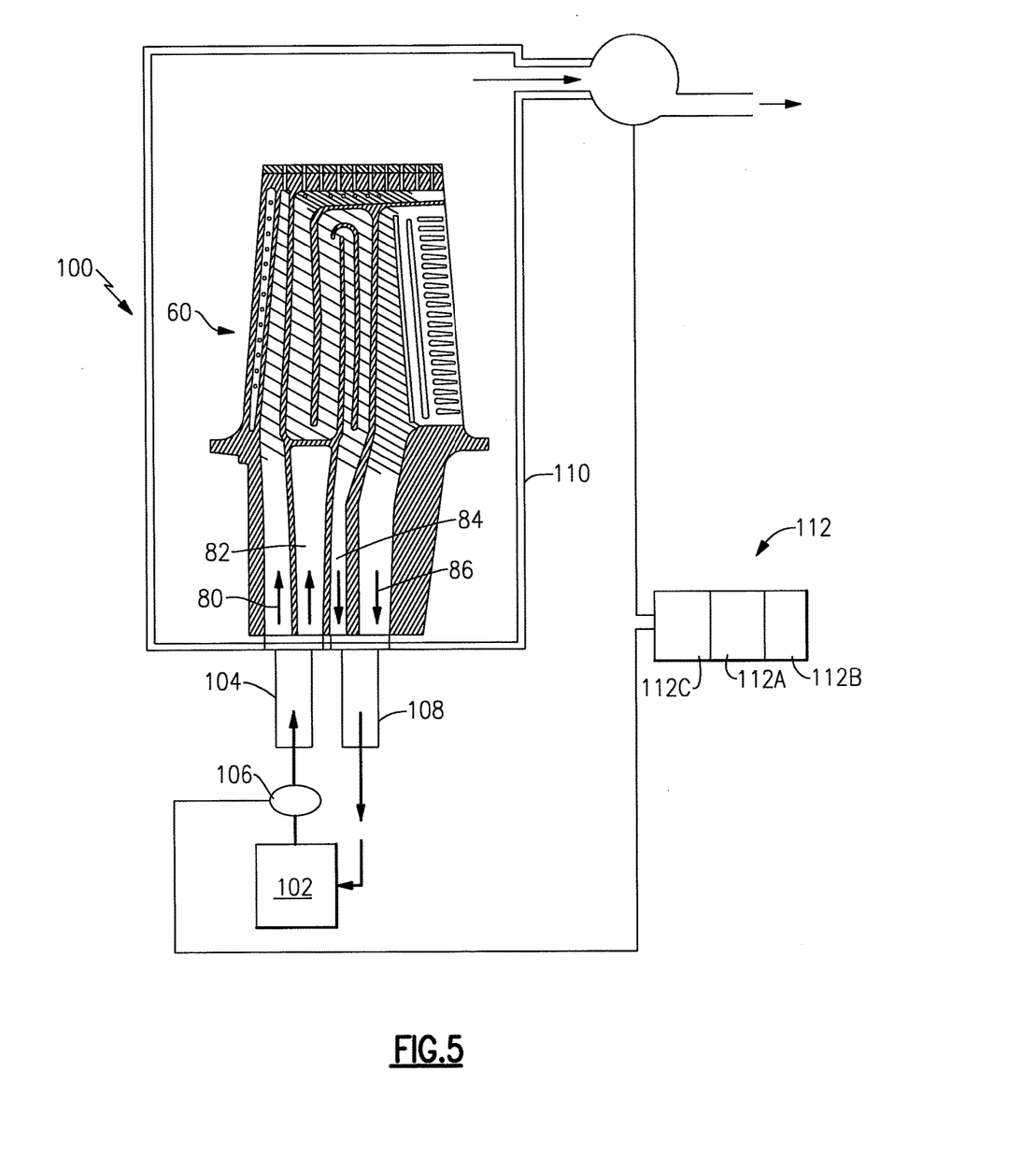
FIG. 5 is a schematic block diagram of a system to fill an airfoil with the laser-blocking material.

With reference to FIG. 5, a system 100 to fill the workpiece 60 with the laser-blocking material 90 generally includes a source 102 of laser-blocking material 90 an inlet connection 104, a pump 106, an outlet connection 108, an enclosed environment (illustrated schematically at 110) and a control 112. It should be appreciated that the system 100 is schematically illustrated and various other components and subsystems may alternatively or additionally be provided.

The enclosed environment 110 is sized to receive and subject the workpiece 60 to a vacuum or partial vacuum. The inlet connection 104 and the outlet connection 108 communicate with the workpiece 60 through the enclosed environment 110. That is, the inlet connection 104 and the outlet connection 108 communicate with the passageways 76-86. It should be appreciated that the inlet connection 104 and the outlet connection 108 include various interfaces such as a fixture mounted to or within the enclosed environment 110 to receive the workpiece 60 and provide communication with the one or more internal passageways of the workpiece 60.

The control 112 operates the pump 106 and functions of the enclosed environment 110 to communicate the laser-blocking material 90 from the source 102 into the workpiece 60 through the inlet connection 104 and out of the workpiece 60 though the outlet connection 108. In one non-limiting embodiment, the control 112 includes a processor 112A, a memory 112B, and an interface 112C. The processor 112A may be any type of known microprocessor having desired performance characteristics. The memory 112B may be any computer readable medium which stores the data and control algorithms described herein. The interface 112C facilitates communication with other systems such as measurement subsystem sensors, and/or as other subsystems.

Figure 6:
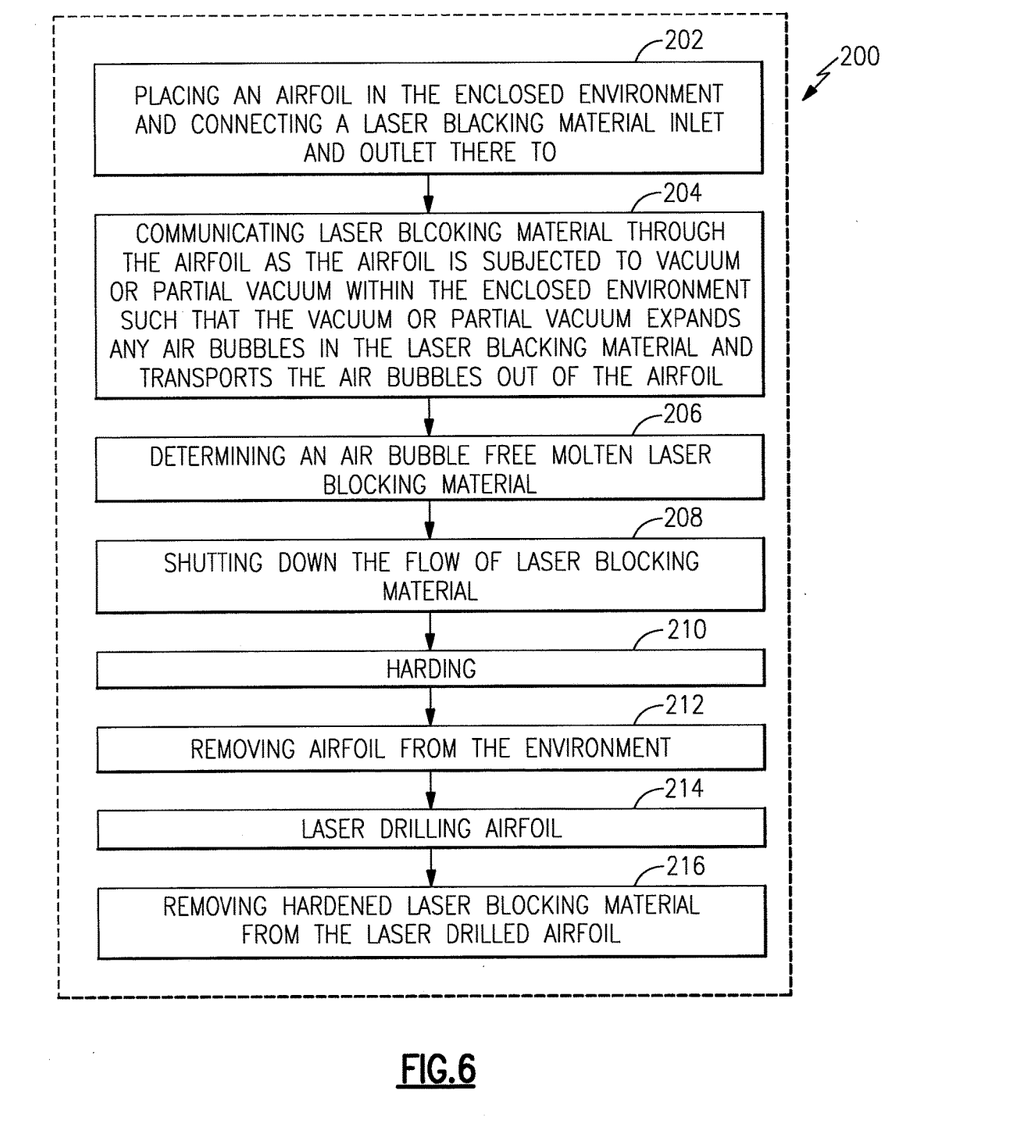
FIG. 6 is a block diagram of a process to fill an airfoil with the laser-blocking material.

With reference to FIG. 6, a process according to one disclosed non-limiting embodiment is illustrated in block diagram form. The workpiece 60 is subjected to vacuum or partial vacuum within the enclosed environment 110 while the laser-blocking material 90 is flowed through one or more of the passageways of the workpiece 60. That is, for example only, passageways 80, 82 are in communication with the inlet connection 104 for the laser-blocking material 90 and passageways 84, 86 are in communication with the outlet connection 108 for the laser-blocking material 90. It should be appreciated that any or all passageways may receive the flow of laser-blocking material 90 so long as flow is provided therethrough.

Initially, the workpiece 60 is first placed in the enclosed environment 110 and the inlet connection 104 and outlet connection 108 are connected thereto (step 202). The flow of laser-blocking material 90 is then communicated through the workpiece 60 as the workpiece 60 is subjected to vacuum or partial vacuum within the enclosed environment 110. The vacuum or partial vacuum expands any air bubbles in the laser-blocking material 90 and transports the air bubbles out of the workpiece 60 (step 204). In other words, the workpiece 60 is subjected to a running flow of laser-blocking material 90 to ensure any air bubbles are consistently being transported out of the workpiece 60 while the vacuum or partial vacuum enclosed environment expands the air bubbles to facilitate their transport. Boyle-Charles' law (PV=constant) shows that the size of the air bubbles will grow when the enclosed environment 110 is depressurized and eventually all the air bubbles are flowed out of the workpiece 60. That is, depressurization facilitates removal of air bubbles from the laser-blocking material 90 within the relatively small, complex, and closely spaced internal cavities.

Once an adequate flow has been provided in response to a predetermined time, measurement of the molten laser-blocking material 90 or other determinant which assures air bubble free molten laser-blocking material 90 (step 206), the flow is shut down (step 208) and the laser-blocking material 90 is allowed to harden (step 210). The workpiece 60 is then removed from the environment 110 (step 212) then laser drilled (step 214). The hardened laser-blocking material 90 may then be removed from the laser drilled workpiece 60 (step 216).

The air bubble free molten laser-blocking material 90 reduces process turn-back. Vacuum degassing of the molten laser-blocking material 90 also facilitates an increase fill speed of the workpiece 60 which facilitates a relatively rapid cycle time.

It should be understood that relative positional terms such as "forward," "aft," "upper," "lower," "above," "below," "bottom", "top", and the like are with reference to the normal operational attitude of the vehicle and should not be considered otherwise limiting.

It should be understood that like reference numerals identify corresponding or similar elements throughout the several drawings. It should also be understood that although a particular component arrangement is disclosed in the illustrated embodiment, other arrangements will benefit herefrom.

Although particular step sequences are shown, described, and claimed, it should be understood that steps may be performed in any order, separated or combined unless otherwise indicated and will still benefit from the present disclosure.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be understood that within the scope of the appended claims, the disclosure may be practiced other than as specifically described. For that reason the appended claims should be studied to determine true scope and content.

What is claimed is:

1. A method of injecting laser-blocking material into a workpiece comprising:
    placing a workpiece in an enclosed environment of a container;
    connecting a laser-blocking material inlet connection and outlet connection to the workpiece;
    subjecting the workpiece to an at least partial vacuum within the enclosed environment through a vacuum outlet orifice in the container that is discrete from the laser-blocking material outlet connection; and
    communicating a molten laser-blocking material into the workpiece through the laser-blocking material inlet connection while subjecting the workpiece to the at least partial vacuum such that air bubbles in the laser-blocking material are expanded and transported out of workpiece through the laser-blocking material outlet connection, wherein the communicating of the molten laser-blocking material into the workpiece subjects the workpiece to a running flow of the laser-blocking material that exits the workpiece through the laser-blocking material outlet connection.

2. The method as recited in claim 1, wherein the workpiece is an airfoil.

3. The method as recited in claim 1, wherein the workpiece is a blade.

4. The method as recited in claim 1, wherein the workpiece is a High Pressure Turbine blade.

5. The method as recited in claim 1, further comprising:
    determining that the molten laser-blocking material within the workpiece is air bubble free; and
    shutting down the flow of laser-blocking material once the molten laser-blocking material within the workpiece is air bubble free.

6. The method as recited in claim 5, further comprising:
    hardening the laser-blocking material; and
    laser drilling the workpiece.

7. The method as recited in claim 6, further comprising removing the hardened laser-blocking material from the laser drilled workpiece.

8. The method as recited in claim 1, wherein the laser-blocking material comprises a wax composition.

9. The method as recited in claim 1, wherein the laser-blocking material comprises an epoxy resin.

10. A method of injecting laser-blocking material into a workpiece, comprising:
    placing a workpiece in a container;
    connecting a laser-blocking material inlet connection and a laser-blocking material outlet connection to the workpiece;
    subjecting the workpiece to an at least partial vacuum within the container; and
    communicating a molten laser-blocking material into the workpiece through the laser-blocking material inlet connection while subjecting the workpiece to the at least partial vacuum such that air bubbles in the laser-blocking material are expanded and transported out of workpiece through the laser-blocking material outlet connection;
    wherein the laser-blocking material comprises a wax composition; and
    wherein the workpiece is subjected to the at least partial vacuum within the container independent of the laser-blocking material outlet connection and through a vacuum outlet orifice in the container that is discrete from the laser-blocking material outlet connection.

11. The method as recited in claim 10, wherein the workpiece comprises an airfoil.

12. The method as recited in claim 10, wherein the workpiece comprises a blade.

13. The method as recited in claim 10, further comprising:
    determining that the molten laser-blocking material within the workpiece is air bubble free; and
    shutting down the flow of laser-blocking material once the molten laser-blocking material within the workpiece is air bubble free.

14. The method as recited in claim 13, further comprising:
    hardening the laser-blocking material; and
    laser drilling the workpiece.

15. The method as recited in claim 14, further comprising removing the hardened laser-blocking material from the laser drilled workpiece.

16. A method of injecting laser-blocking material into a workpiece, comprising:
    placing a workpiece in a container;
    connecting a laser-blocking material inlet connection and a laser-blocking material outlet connection to the workpiece;
    subjecting the workpiece to an at least partial vacuum within the container; and
    communicating a molten laser-blocking material into the workpiece through the laser-blocking material inlet connection while subjecting the workpiece to the at least partial vacuum such that air bubbles in the laser-blocking material are expanded and transported out of workpiece through the laser-blocking material outlet connection;

wherein the laser-blocking material comprises an epoxy resin; and wherein the workpiece is subjected to the at least partial vacuum within the container independent of the laser-blocking material outlet connection and through a vacuum outlet orifice in the container that is discrete from the laser-blocking material outlet connection.

17. The method as recited in claim 16, wherein the workpiece comprises an airfoil.

18. The method as recited in claim 16, further comprising:
determining that the molten laser-blocking material within the workpiece is air bubble free; and
shutting down the flow of laser-blocking material once the molten laser-blocking material within the workpiece is air bubble free.

19. The method as recited in claim 18, further comprising:
hardening the laser-blocking material; and
laser drilling the workpiece.

20. The method as recited in claim 19, further comprising removing the hardened laser-blocking material from the laser drilled workpiece.

\* \* \* \* \*